United States Patent [19]

Howdle

[11] Patent Number: 4,825,232
[45] Date of Patent: Apr. 25, 1989

[54] APPARATUS FOR MOUNTING AERIAL SURVEY CAMERA UNDER AIRCRAFT WINGS

[75] Inventor: William J. Howdle, Roanoke, Tex.

[73] Assignee: Enserch Corporation, Dallas, Tex.

[21] Appl. No.: 173,371

[22] Filed: Mar. 25, 1988

[51] Int. Cl.⁴ .................... G03B 29/00; G03B 17/00
[52] U.S. Cl. ................................... 354/74; 354/81
[58] Field of Search .................. 354/74, 81, 293, 65, 354/70; 352/243; 244/118.1, 137.4, 129.1; 248/317

[56] References Cited

U.S. PATENT DOCUMENTS

| | | | |
|---|---|---|---|
| 3,176,308 | 3/1965 | Jensen | 354/70 X |
| 3,523,660 | 8/1970 | Attebery et al. | 354/74 X |
| 3,689,012 | 9/1972 | Liston | 244/118.1 |
| 4,174,162 | 11/1979 | Giacomini et al. | 354/70 |
| 4,320,949 | 3/1982 | Pagano | 354/81 |
| 4,752,791 | 6/1988 | Allred | 354/81 |

Primary Examiner—A. A. Mathews
Attorney, Agent, or Firm—Ross, Howison, Clapp & Korn

[57] ABSTRACT

A removable adaptor mount for receiving a camera-carrying gimbal beneath an aircraft wing has a base plate with a clamp for removably engaging the diagonal wing strut. An anchor on the base spaced from the strut clamp can be secured to the wing. Holes on the base permit a conventional gimbal to be bolted to the mount.

4 Claims, 1 Drawing Sheet

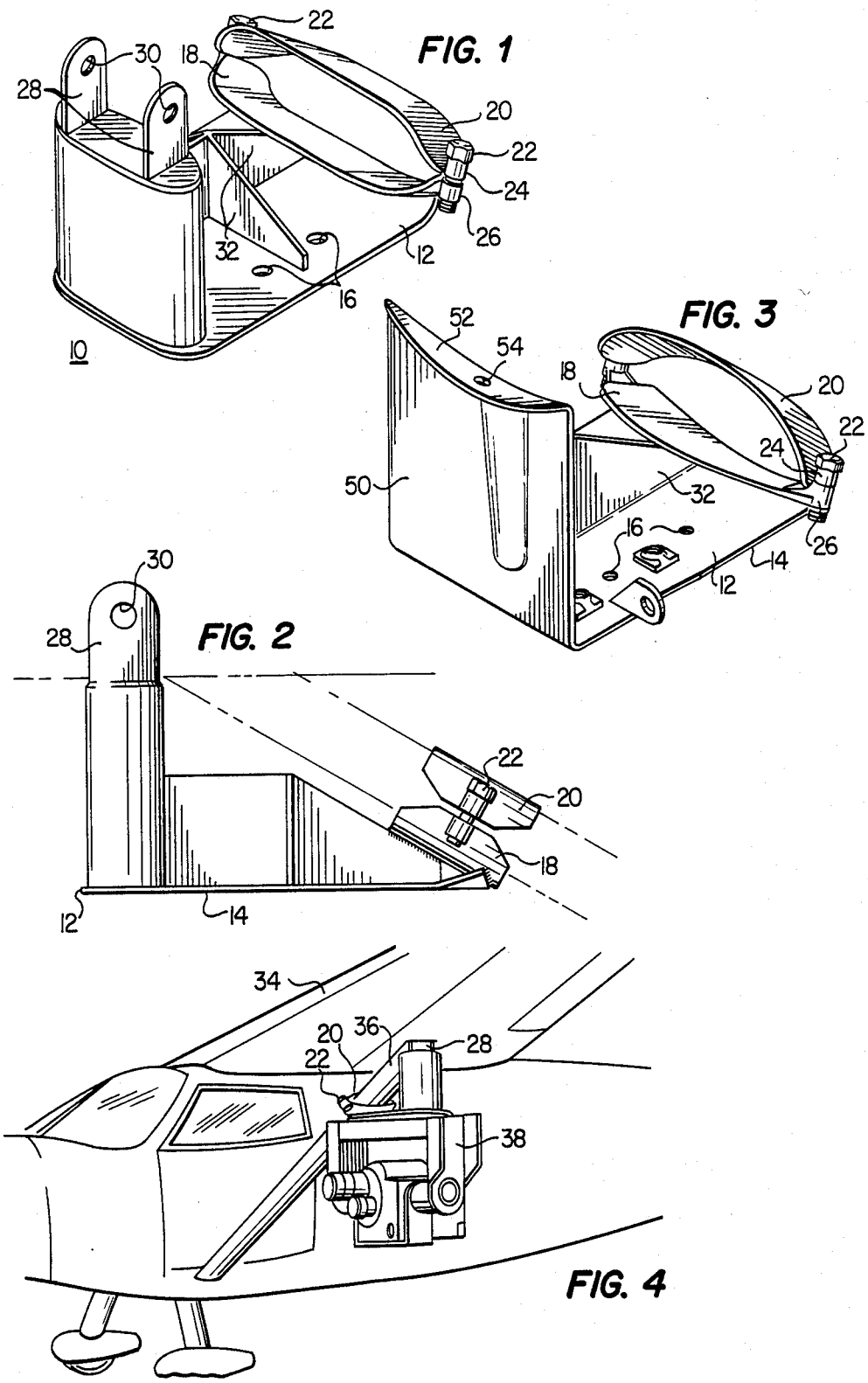

APPARATUS FOR MOUNTING AERIAL SURVEY CAMERA UNDER AIRCRAFT WINGS

FIELD OF THE INVENTION

This invention relates to apparatus for mounting aerial survey cameras on aircraft, and particularly to a mounting apparatus for securing a camera-carrying gimbal below an aircraft wing which is supported by a diagonal wing strut.

BACKGROUND OF THE INVENTION

Aerial survey by means of conventional film camera or videotape recording camera is a convenient and popular technique for permitting review of conditions over extended land areas. For example, the operators of gas transmission lines may utilize such techniques for producing a convenient film or tape record which may be viewed to reveal conditions on, and immediately adjacent to, the pipeline easement. In this manner hundreds of miles of pipeline may be easily and relatively quickly reviewed at operational headquarters by appropriate personnel.

Conventional techniques for conducting such surveys have included helicopter mounts and mounts for the fuselage of fixed wing aircraft. I have discovered that video recordings of the best possible quality and fidelity may be produced utilizing this invention, which permits a video camera-carrying gimbal to be mounted underneath the wing of fixed wing aircraft, spaced from the fuselage. The mount itself may be readily secured in position on the wing, and is quickly removable when not needed.

SUMMARY OF THE INVENTION

In accordance with my invention, there is provided a mount for securing a camera-carrying gimbal below an aircraft wing which is supported by a diagonal wing strut. The mount includes a base, and strut clamping means carried by the base for removably surrounding and engaging the diagonal wing strut. The base carries an anchor means spaced from the strut clamping means for securement to the airplane wing. The base also has gimbal attachment means for removably holding the gimbal below the base.

In a specific form of the invention, the strut clamping means is formed by an upstanding saddle formed integrally on the base having a surface conforming to the strut when the base is substantially horizontal, and further including a generally U-shaped clamp plate secured by bolts facing the saddle, whereby the clam plate and saddle may snugly but removably engage the wing strut.

Specific anchoring means which may be provided include an arrangement of two upstanding ears having aligned holes therethrough, which may be inserted through the lower surface of the wing and held firmly in place by the wing strut retaining bolt. Alternatively, the anchoring means may include a flange with a hole therein for securement to the lower surface of the win by a wing tie down bolt.

BRIEF DESCRIPTION OF THE DRAWINGS

FIG. 1 is a perspective view of a mount embodying the invention;

FIG. 2 is a plan view of the mount shown in FIG. 1;

FIG. 3 is a perspective view of a second embodiment of the invention; and

FIG. 4 is a perspective view showing the mount of FIGS. 1 and 2 installed beneath an aircraft wing, with gimbal attached.

DETAILED DESCRIPTION

A mount constructed in accordance with this invention is generally designated by the reference numeral 10 in FIGS. 1 and 2. Mount 10 is particularly suited for adapting a Cessna 182 aircraft for receiving a camera-carrying gimbal under its wing. The mount has a base plate 12 including a flat lower surface 14. Gimbal mounting holes 16 are formed in base 12. An upstanding C-shaped saddle 18 is formed at one end of base 12 to provide one part of a strut clamp. Separate clamping plate 20 cooperates with the saddle 18 to complete the clamp. The complementary confronting surfaces of saddle 18 and clamping plate 20 are shaped to snugly and surroundingly engage a wing strut. Saddle 18 and plate 20 may be removably secured together by means of bolts 22 extending through holes 24 in the plate and holes 26 in the saddle. The other end of base 12 opposite the saddle 18 is provided with anchoring means which in this embodiment are upstanding ears 28. The ears 28 are each provided with holes 30 aligned for receiving a strut bolt to secure the anchoring ears 28 in the aircraft wing. Base 18 is also provided with upstanding reinforcing webs 32 to strengthen the assembly and stabilize the platform provided by mount 10.

The mount 10 may be formed into a unitary structure combining the base 12, saddle 18, anchors 28 and webs 32 by means of welding.

The mount 10 as illustrated in FIG. 4 is secured in position to an aircraft wing 34 and diagonal wing strut 36. As illustrated in FIG. 4, the saddle 18 and clamping plate 20 are securely held in position surrounding the strut 36 by bolts 22. At its opposite end, the device is anchored to wing 40 by means of ears 28 which cooperate with the conventional structure of the wing (not shown) which secures strut 36 to the spar of wing 34. That is, the generally horizontal strut bolt that secures the strut 36 in the interior of wing 34 also extends through anchors 28 and secures them to the strut and wing.

It will be appreciated that the adaptor mount depicted can readily be installed on an aircraft wing, and just as readily removed when not needed. In position, the device provides a stable horizontal platform provided by the mounting surface 14 for receiving a conventional camera-carrying gimbal 38. Optionally, additional stability may be provided to the assembled structure by a rearwardly and upwardly extending anchor from the base where the gimbal is secured to a rear portion of the wing.

An alternate embodiment of the invention is illustrated in FIG. 3. For the most part, the elements of the device are the same as those depicted in FIGS. 1 and 2, but the means for anchoring the mount directly to the wing are modified. As shown in FIG. pe g 013, the anchor 50 spaced from saddle 18 on base 10 is 00 provided with a wing engaging flange 52 having a hole 54 formed therein. This embodiment may be anchored to the wing by means of a plane tie-down eyebolt conventionally secured to the lower surface of the wing. By removing the bolt, the hole 54 may be placed in position against the wing, and secured thereto by replacing the bolt in its normal position.

It will be appreciated that the applications of this invention permit a convenient and simple way of adapting fixed wing aircraft for aerial survey work. The mounting of a conventional gimbal utilizing this invention under the wing spaced from the fuselage has been found to produce good quality survey records.

Although a preferred embodiment of the invention has been described in the foregoing detailed description and illustrated in the accompany drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A mount for securing a camera-carrying gimbal below an aircraft wing supported by a diagonal wing strut comprising:
   (a) a base;
   (b) strut clamping means carried by the base for removably surrounding and engaging the diagonal wing strut;
   (c) anchor means on the base spaced from the strut clamping means, and adapted to securement to the airplane wing; and
   (d) gimbal attachment means carried by the base for removably holding the gimbal below the base.

2. The device of claim 1, wherein the strut clamping means comprises:
   (a) an upstanding saddle formed integrally on the base having a surface conforming to the strut when the base is substantially horizontal; and
   (b) a generally U-shaped clamp plate secured facing the saddle by bolts and its extremities, whereby the clamp plate and saddle may snugly but removably engage the wing strut.

3. The device of claim 1, wherein the aircraft wing has a strut retaining belt retaining the upper end of the strut, and wherein the anchor means includes two upstanding ears with holes therein, whereby the ears may be inserted through apertures in the lower surface of the wing and held firmly in place by the strut retaining bolt.

4. The device of claim 1, wherein the anchor means includes a flange having a hole thereon for securement to the lower surface of the wing by a wing tie-down bolt.

* * * * *

UNITED STATES PATENT AND TRADEMARK OFFICE
CERTIFICATE OF CORRECTION

PATENT NO. : 4,825,232

DATED : April 25, 1989

INVENTOR(S) : William J. Howdle

It is certified that error appears in the above-identified patent and that said Letters Patent is hereby corrected as shown below:

Column 2, Line 39:
After wing, delete [40] and insert -- 34 --

Column 2, Line 60:
After FIG., delete [pe g 013] and insert -- 3 --

Column 2, Line 61:
After is, delete [00]

Column 4, Line 16:
After retaining, delete [belt] and insert -- bolt --

Signed and Sealed this

Second Day of January, 1990

Attest:

JEFFREY M. SAMUELS

Attesting Officer     Acting Commissioner of Patents and Trademarks